United States Patent [19]

Lowe, Jr.

[11] Patent Number: 5,542,084
[45] Date of Patent: Jul. 30, 1996

[54] METHOD AND APPARATUS FOR EXECUTING AN ATOMIC READ-MODIFY-WRITE INSTRUCTION

[75] Inventor: Robert B. Lowe, Jr., North Chelmsford, Mass.

[73] Assignee: Wang Laboratories, Inc., Billerica, Mass.

[21] Appl. No.: 343,268

[22] Filed: Nov. 22, 1994

Related U.S. Application Data

[63] Continuation of Ser. No. 135,109, Oct. 12, 1993, abandoned.
[51] Int. Cl.$^6$ ........................................................ G06F 9/30
[52] U.S. Cl. ...................... 395/375; 395/482; 364/DIG. 1
[58] Field of Search ............................... 395/375, 425, 395/474, 481, 482

[56] References Cited

U.S. PATENT DOCUMENTS

| | | | |
|---|---|---|---|
| 3,430,209 | 2/1969 | Goshorn | 340/172.5 |
| 3,982,229 | 9/1976 | Rouse et al. | 395/775 |
| 4,740,922 | 4/1988 | Ogawa | 365/189.04 |
| 4,761,755 | 8/1988 | Ardini, Jr. et al. | 364/749 |
| 4,884,271 | 11/1989 | Concha et al. | 371/40.2 |
| 4,896,259 | 1/1990 | Jacobs et al. | 395/250 |
| 5,167,029 | 11/1992 | Eikill et al. | 395/885 |
| 5,235,693 | 8/1993 | Chinnaswamy et al. | 395/486 |
| 5,394,535 | 2/1995 | Ohuchi | 395/482 |

FOREIGN PATENT DOCUMENTS 0177712   4/1986   European Pat. Off. .

OTHER PUBLICATIONS

Harmar et al. "The Motorola MC68000 Microprocessor Family:Assembly Language, Interface Design, & Sysam Design" pp.106–108, 398–408, 438, 492–499.

IEEE Micro vol. 10, No. 3, Jun. 1990, New York, USA pp. 48–66 M. Alsup Motorola's 88000 Family Architecture p. 55, left column paragraph 6.

Primary Examiner—Krisna Lim
Assistant Examiner—Viet Vu
Attorney, Agent, or Firm—Ronald J. Paglierani

[57] ABSTRACT

A circuit that enhances the performance of the execution of a read-modify-write instruction type. The circuit provides hardware detection and decoding of various options specified by the instruction, and greatly improves the performance and conserves space within a micro-code control store (14). The circuit also detects anomalous cases and reports them to micro-code for special handling. The detection of the anomalous cases occurs dynamically and in parallel to instruction execution, thereby improving performance. Resulting condition codes are also provided simultaneously to the control program. The circuit operates in concert with a micro-code controlled mechanism to read a memory variable and, based on the specification of the instruction, the circuit selectively adds 1, subtracts 1, adds a 16-bit mask specified by the instruction, or subtracts the 16-bit mask, and returns the result to a central processor (12). Anomalous conditions that include overflow, invalid mask specification, and a special exchange option are all simultaneously detected and reported to the micro-code.

17 Claims, 8 Drawing Sheets

METHOD AND APPARATUS FOR EXECUTING AN ATOMIC READ-MODIFY-WRITE INSTRUCTION

This is a continuation of application Ser. No. 08/135,109 filed on Oct. 12, 1993 now abandoned.

FIELD OF THE INVENTION

This invention relates generally to digital data processors and, in particular, to digital data processors that execute an atomic, read-modify-write type of memory instruction.

Background of the Invention

A read-modify-write (RMW) type of instruction is accomplished by reading a memory location, modifying the data read from the memory, and then writing the modified data back out to the memory. This occurs in what is referred to as an "atomic" memory cycle. That is, the memory is locked from the time the data is read until the modified data is written back. Locking the memory prevents another memory requestor from gaining access to the memory and possibly modifying the location of interest. Performing the atomic operation also prevents the data processor from being interrupted during the RMW cycle.

Such RMW memory operations are useful for, by example, maintaining a counter of external events or for counting a number of loops through a particular section of code.

As can be appreciated, in that the memory is locked during the execution of the RMW cycle, another memory requestor, such as an I/O device or another processor, is prevented from accessing the memory. Furthermore, in that the RMW instruction may be executed a large number of times before a desired condition occurs, the amount of time required to execute each RMW instruction impacts directly upon the CPU efficiency and operating speed.

One conventional type of RMW instruction is provided by the VS Assembly Language program that is available from Wang Laboratories Inc. of Lowell, Mass.

This instruction, referred to as a Modify Count (MCOUNT) instruction, enables a specified memory location to be selectively incremented by one, decremented by one, exchanged with a register, or incremented or decremented by a half-word amount specified in a mask operand.

As can be appreciated, for a RMW instruction of this complexity a significant number of constituent microinstructions can be required to implement all of the variations made possible by the instruction. In addition, other microinstructions are required to set and check condition codes, and to perform the testing of the result and/or the instruction itself to detect conditions that require special handling by the data processor, such as an overflow condition or an invalid instruction specification at run-time.

Objects of the Invention

It is thus one object of this invention to provide an improved atomic RMW-type of instruction.

It is another object of this invention to provide an RMW instruction that operates in conjunction with dedicated hardware, i.e., a hardware-assisted RMW instruction.

It is one further object of this invention to provide a RMW instruction that requires significantly fewer constituent microinstructions than a conventional RMW instruction.

SUMMARY OF THE INVENTION

The foregoing and other problems are overcome and the objects of the invention are realized by a circuit arrangement that enhances the performance of the execution of the MCOUNT VS Assembler instruction. By providing hardware detection and decoding of various options of the MCOUNT instruction the circuit greatly improves performance and conserves a limited control store space. The circuit arrangement also detects several anomalous cases and reports them to micro-code for special handling. The detection of the anomalous cases occurs dynamically and in parallel to instruction execution, thereby improving performance. Resulting condition codes are also provided simultaneously to the control program.

The circuit arrangement operates in concert with a micro-code controlled mechanism to read a memory variable and, based on the specification of the MCOUNT Instruction, the circuit selectively adds 1, subtracts 1, adds a 16-bit mask specified by the MCOUNT Instruction, or subtracts the 16-bit mask, and returns the result to the central processor. Anomalous conditions that include overflow, invalid mask specification, and a special exchange option are all simultaneously detected and reported to the micro-code.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
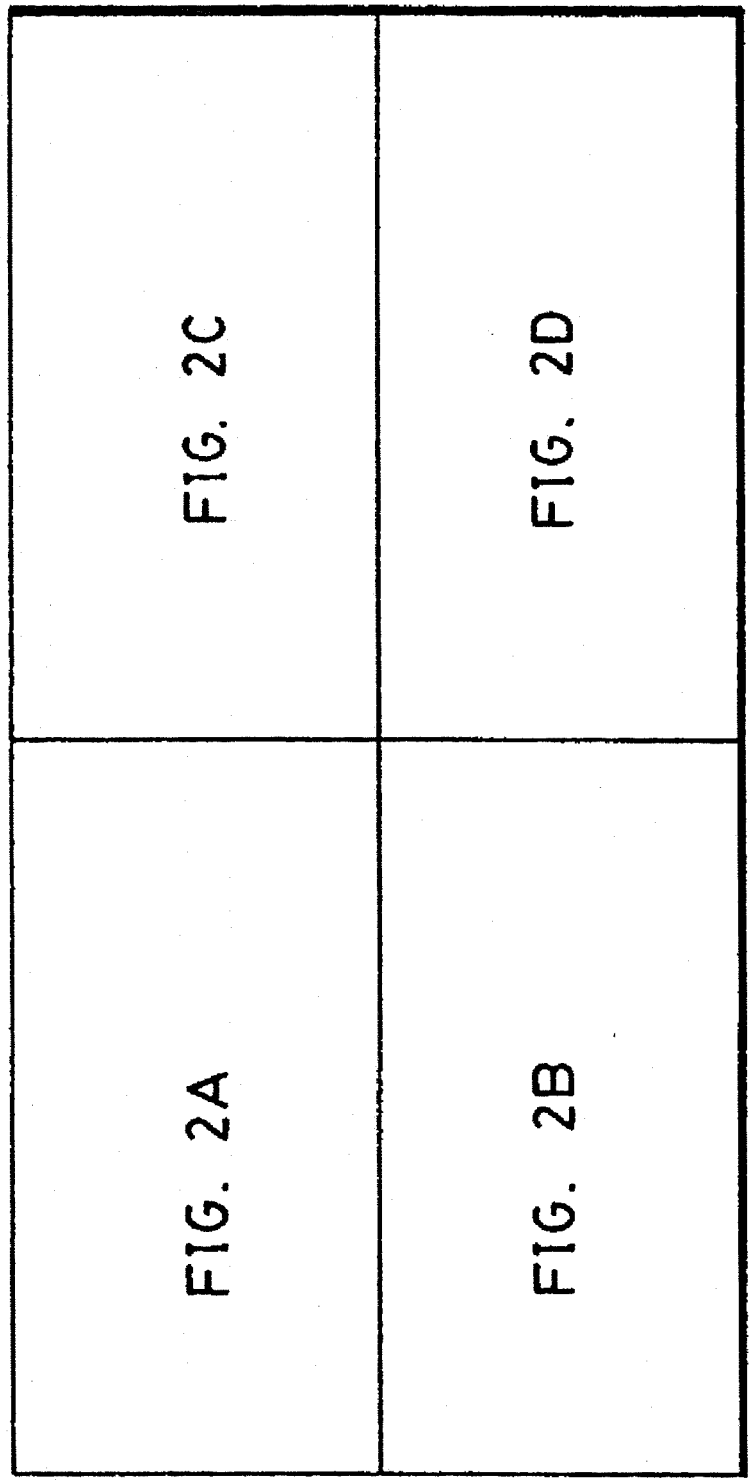
FIG. 1 illustrates the arrangement of FIGS. 2A–2D.
Figure 2A:
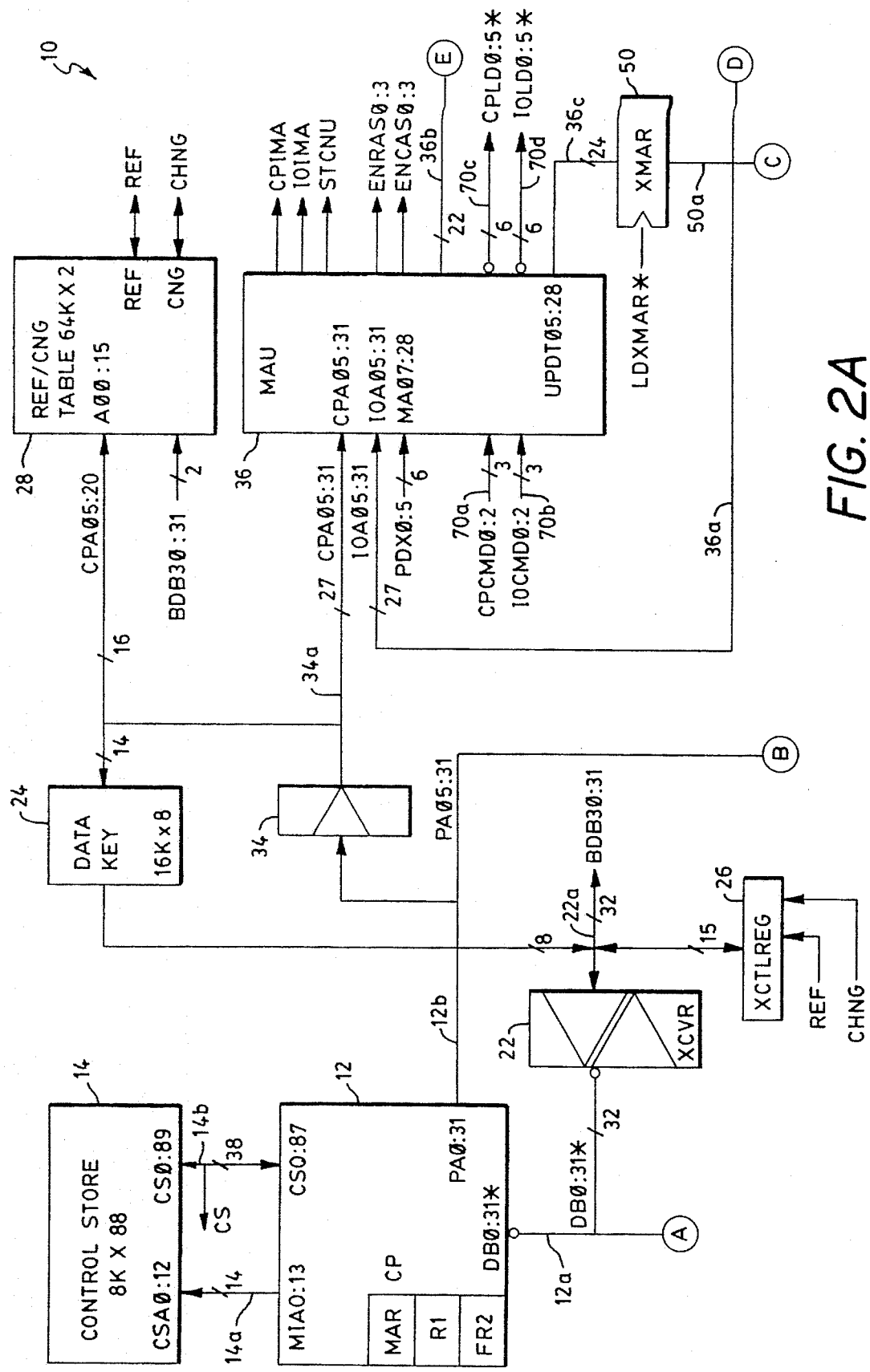
FIGS. 2A–2D are each a portion of a block diagram of a data processor that is constructed and operated in accordance with this invention.
Figure 2B:
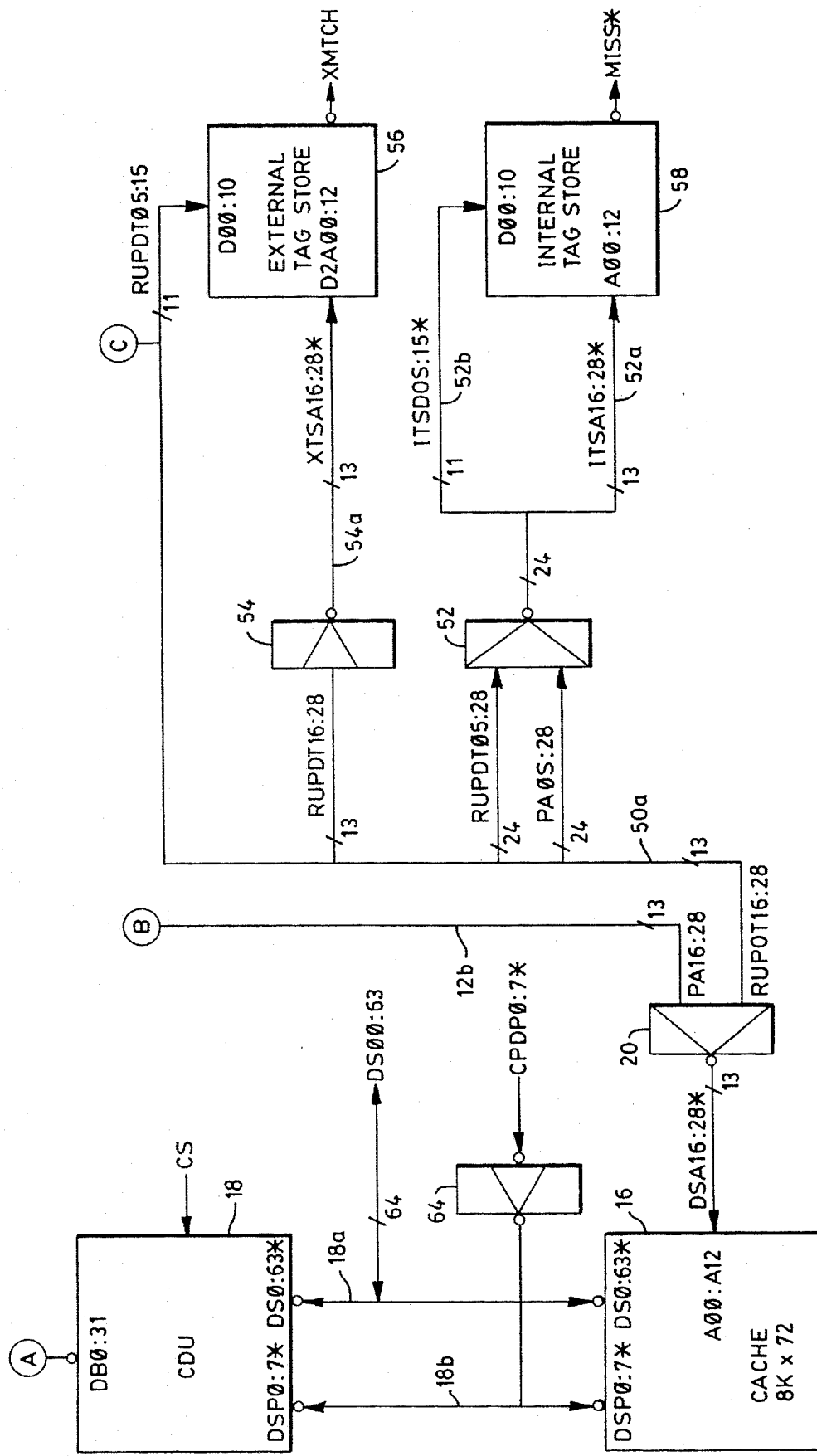
Figure 2C:
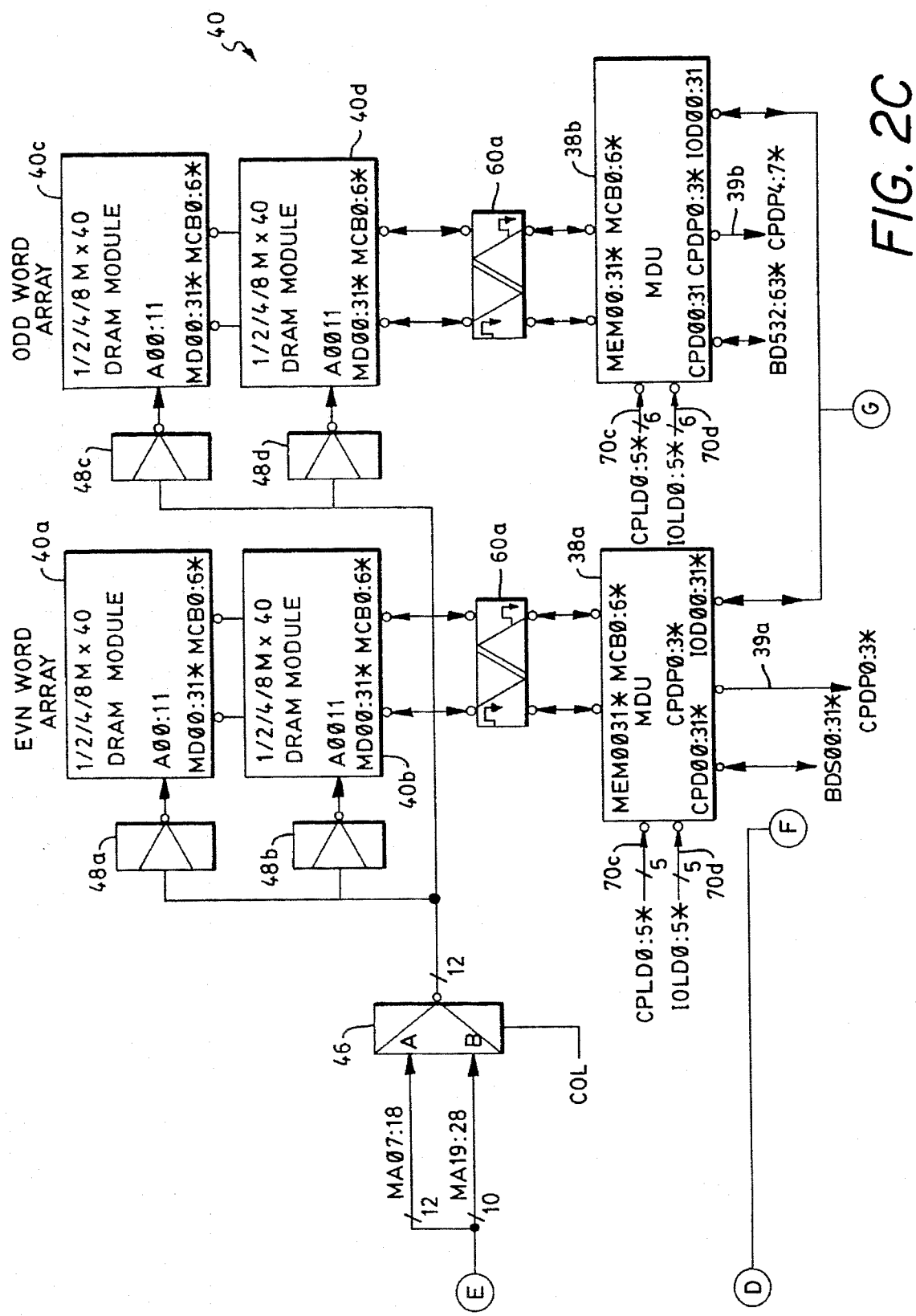
Figure 2D:
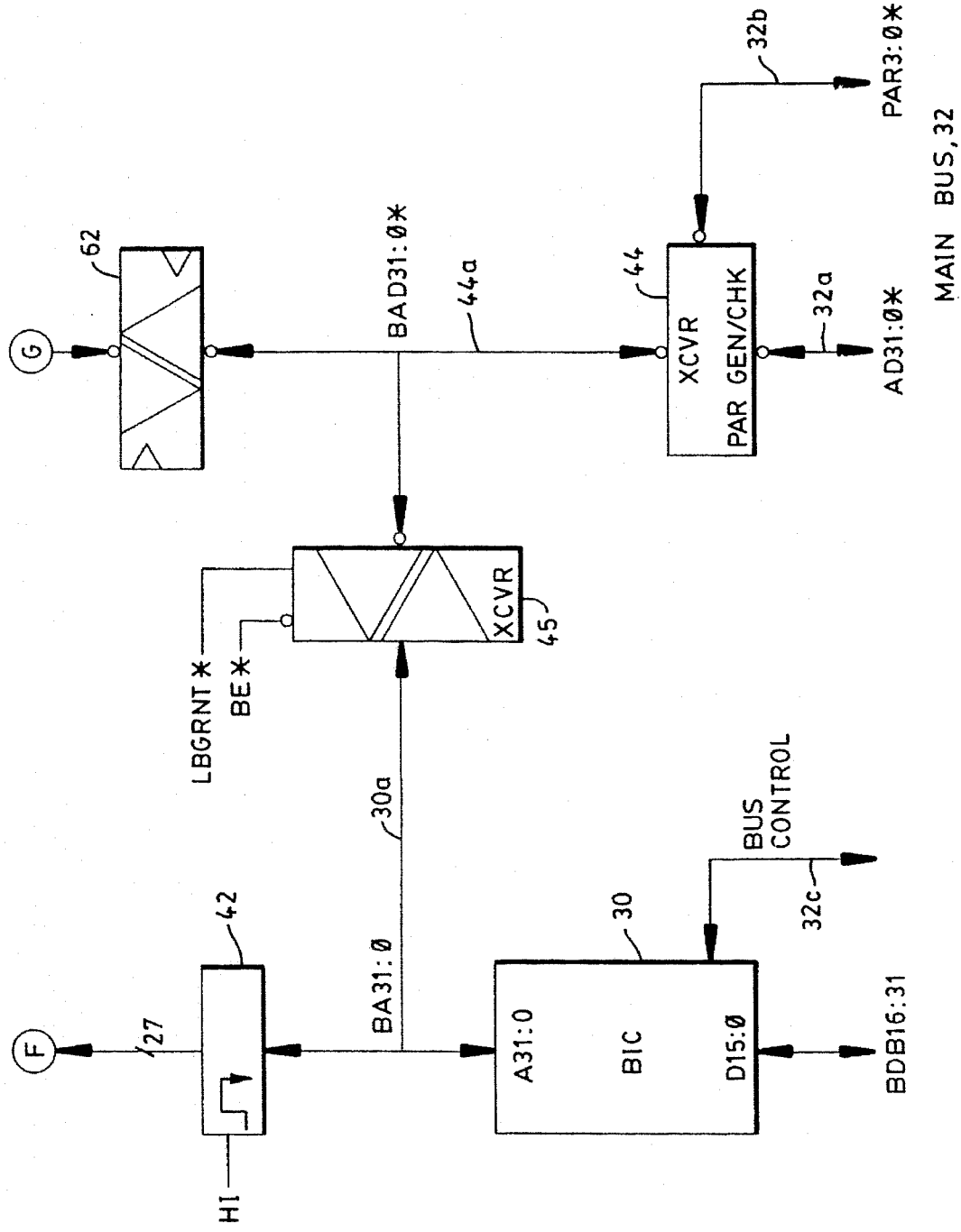

Reference is made to FIGS. 2A–2D for the ensuing description of one embodiment of a data processor 10 that is constructed and operated in accordance with this invention. A Central Processor (CP) 12 is coupled to an 8K by 88-bit Control Store 14 by a 14-bit control store address bus 14a and an 88-bit control store data bus 14b. The Control Store 14 stores microinstructions (micro-code) which are read into the CP 12 in order to execute macroinstructions that are read from an 8K by 72-bit CACHE memory 16, via a CACHE Data Unit (CDU) 18, bidirectional 64-bit data bus BDS00:63 18a, and bidirectional 32-bit data bus DB00:32 12a. Macroinstructions are fetched from the CACHE memory 16 in accordance with physical addresses provided by the CP 12 on a 32-bit physical address bus (PA0:31) 12b, via a CACHE address multiplexer (MUX) 20. The CACHE address MUX 20 is employed when pre-filling the CACHE 16 with instructions and data. In this embodiment of the invention only PA bits 16:28 are provided to the CACHE 20. PA bit 28 being provided as the LSB address bit enables a Double-Word (eight bytes or two 32-bit words) to be read by the CP 12 over the 64-bit bus 18a and 32-bit bus 12a. The eight bit DSP0:7 bus 18b conveys data parity bits between the CACHE 16 and the CDU 18. The CDU 18 operates as a data buffer for interfacing the 32-bit CP 12 data bus 12a to the 64-bit cache/main memory data bus 18a, as a data error checker, and provides data alignment for the CP 12. The CDU 18 receives a sub-set of the Control Store 14 output bits (CS) and includes the logic that provides the hardware-assisted MCOUNT instruction of this invention, as will be described in detail below with respect to FIGS. 3A and 3B.

In the presently preferred embodiment of this invention the macroinstructions that are read from the CACHE 16 are those that implement the VS Assembly Language program that is provided by Wang Laboratories Inc. of Lowell Mass. One of the macroinstructions is referred to as the Modify Count (MCOUNT) instruction that was briefly described above. A presently preferred technique for providing a hardware assist for the MCOUNT instruction is described in detail below.

Continuing with the description of the block diagram of FIGS. 2A–2D, the 32-bit processor data bus 12a is buffered by a transceiver 22 and is provided as a buffered data bus (BDB0:31) 22a to several locations, including a 16K by 8-bit Data Key memory 24, a 16-bit control and status register (XCTLREG) 26, a reference and change table (REF/CHG TABLE) 28, and a system (backplane) Bus Interface Chip (BIC) 30. This data path gives the CP 12 an ability to send control information to, and read status information from, these various devices.

The Data Key memory 24 stores encrypted information and provides a capability to enable only specified software packages to be executed by the CP 12. The REF/CHG Table 28 functions to indicate a reference to a particular page of memory, and to indicate if the reference was a write operation. The BIC 30 provides an interface to other components that are coupled to the system bus 32, the system bus including a 32-bit multiplexed address/data bus (AD31:0) 32a, associated parity lines (PAR3:0) 32b, and control signal lines 32c. In general, the BIC 30 operates to arbitrate access to the system bus 32 and to perform all necessary handshaking with other devices that are coupled to the system bus 32. A memory control function is also contained within the BIC 30. The XCTLREG 26 enables control over the CACHE memory 16, indicates CACHE status, and also provides indications of correctable and uncorrectable data errors.

A buffer 34 drives the PA bus 12b as a CP Address (CPA) bus 34a to the Data Key 24 (14 bits), the REF/CHG Table 28 (16 bits) and a Memory Address Unit (MAU) 36 (27 bits). The MAU 36 operates to queue memory read and write addresses and functions, in conjunction with even and odd Memory Data Units (MDUs) 38a and 38b, respectively, to write and read data from main memory 40. Main memory 40 is comprised of a plurality of DRAM modules 40a–40d, and is organized as an even word array (modules 40a and 40b) and as an odd word array (modules 40c and 40d). The total width of the main memory 40 is 64 bits (a double word), plus 14 bits of ECC parity information. ECC is performed separately on each odd and even 32-bit memory word.

The MAU 36 also receives a 27-bit I/O address (IOA) bus 36a that is sourced from the BIC 30 via a Buffered Address (BA) bus 30a and a latch 42. IOA bus 36a provides a first memory address of a data block that is to be written to or read from by an I/O device that is coupled to the system bus 32. The first address is received though a transceiver 44, a buffered address/data (BAD) bus 44a, and a transceiver 45. Transceiver 45 is enabled to pass the first memory address of the memory block to the BIC 30 and the latch 42, via the BA bus 30a. In the MAU 36 the first address is buffered, and subsequent memory addresses are incremented by the BIG 30 during an I/O operation and provided over the buses 30a and 36a, via latch 42. This enables a potentially large number of reads or writes to be made to consecutive memory locations of the main memory 40.

One output of the MAU 36 is a 22-bit memory address (MA) bus 36b that is applied to a row/column MUX 46 which has a 12-bit output for sequentially providing row and column addresses, via drivers 48a–48d, to the DRAM modules 40a–40d, respectively. The row/column MUX 46 operates under the control of a COL signal that is generated by a memory control state machine (not shown).

Another output of the MAU 36 is a 24-bit update address (UPDT) bus 36c that is latched by a register XMAR 50. XMAR 50 sources a registered update address (RUPDT) bus 50a to the MUX 20 (13 bits), to a MUX 52 (24 bits), to a driver 54, and to an External Tag Store 56. Also provided to MUX 52 is the PA bus 12b. The output of the MUX 52 is a 13-bit internal tag store address (ITSA) bus 52a and an 11-bit internal tag store data (ITSD) bus 52b which are applied to an Internal Tag Store 58. The output of the driver 54 is a 13-bit external tag store address (XTSA) bus 54a which is applied to the External Tag Store 56, in conjunction with 11-bits of the RUPDT bus 50a. The External Tag Store 56 and the Internal Tag Store 58 provide CACHE hit and miss detection, XMIS and IMIS, respectively, for I/O accesses and CP 12 accesses, respectively.

The MDUs 38a and 38b operate in conjunction with registered buffers 60a and 60b, respectively, to provide a data queue for read and write accesses of the main memory 40. The MDUs 38a and 38b also each provide for word-wide ECC generation and checking functions for data going to and coming from the main memory 40. Each of the MDUs 38a and 38b is bidirectionally coupled to one word (32-bits) of the 64-bit buffered data bus 18a, and thereby to the CACHE 16 and to the CDU 18. Each of the MDUs 38a and 38b also source 4-bits of the 8-bit CP Data Parity (CPDP) bus which is provided through a buffer 64 to the eight bit DSP0:7 bus 18b that conveys data parity bits between the CACHE 16 and the CDU 18. The MDUs 38a and 38b each also have a 32-bit I/O data path (IOD) and are bidirectionally coupled in parallel to a transceiver 62 and thence to the BAD bus 44a. For I/O data transfers to or from the system bus 32 the MDUs are alternately selected to either transmit up to a 32-bit word to the transceiver 62 or receive up to a 32-bit word from the transceiver 62.

The data processor 10 of FIGS. 2A–2D, in a presently preferred embodiment of the invention, is packaged on a single multi-layered printed circuit board. The CDU 18, MAU 36, the MDUs 38a and 38b, and the BIC 30 are each contained within an Application Specific Integrated Circuit (ASIC). A CP 12 cycle is a minimum of 50 nanoseconds in duration (20 MHz clock frequency), and is comprised of two or more 50% duty cycle 25 nanosecond sub-cycles or "ticks". The CP 12 clock is synchronized to a 50 nanosecond clock signal that is provided on the system bus 32.

Figure 3A:
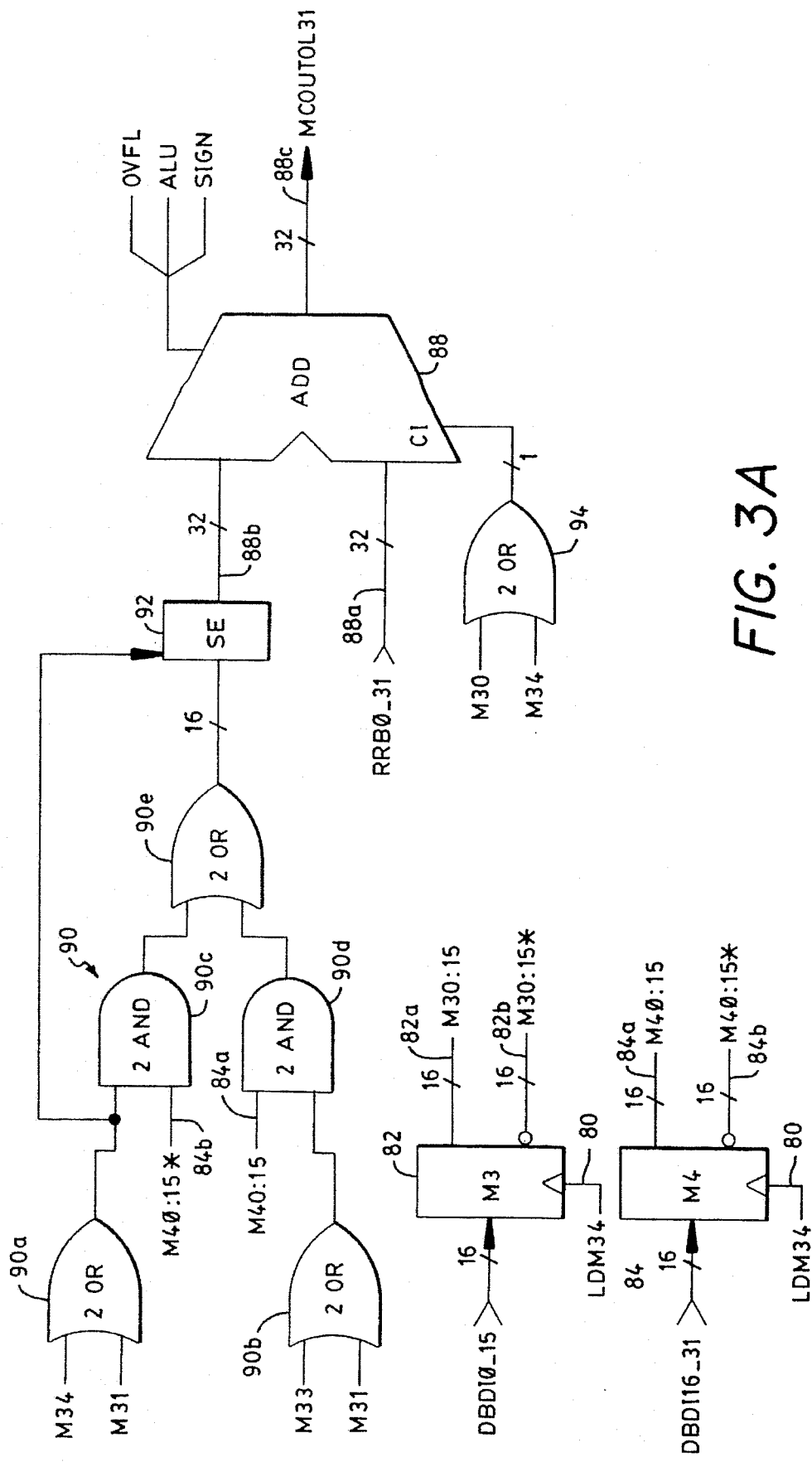
FIGS. 3A and 3B are schematic diagrams of logic circuitry that provides the hardware-assisted MCOUNT instruction of this invention.
Figure 3B:
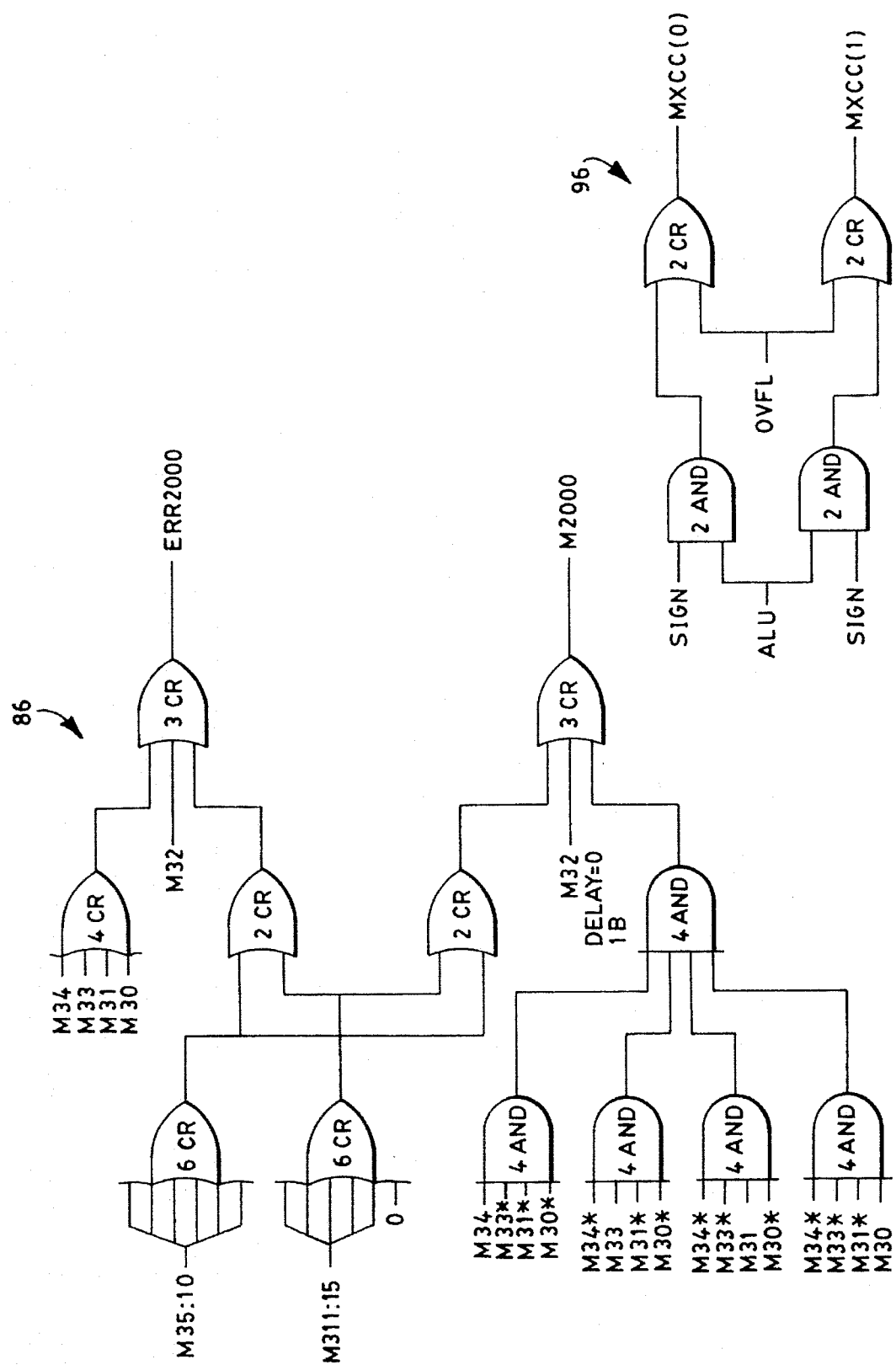
Figure 4:
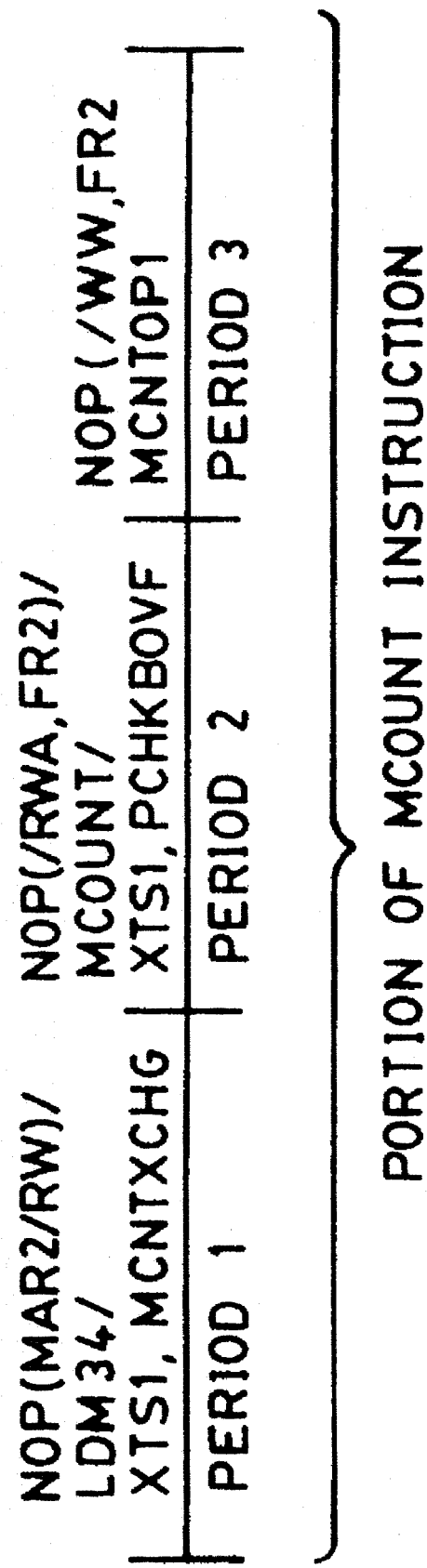
FIG. 4 is a timing diagram for the hardware assisted MCOUNT instruction.

Having thus described the technical environment within which the present invention operates, a detailed description of the MCOUNT assembly language instruction hardware assist logic now ensues. This logic is preferably embodied external to the CP 12, within the CDU 18, and is shown in FIGS. 3A and 3B.

The format for the MCOUNT instruction is as follows:

MCOUNT R1, D2(X2,B2), M3, M4.

R1 is a general CP 12 register into which the main memory word addressed by the second operand D2(X2,B2) is copied after being modified by addition or subtraction. The second operand addresses a target word in main memory 40 which is fullword aligned. M3 is a 16-bit function mask that determines the operation performed by MCOUNT. M4 is a 16-bit unsigned integer used as an increment for add immediate and subtract immediate functions, if specified by M3.

The functions listed in the following Table 1 are available using the associated M3 mask values.

TABLE 1

| | |
|---|---|
| X'8000' | Add one to main memory word; result to R1 |
| X'4000' | Subtract one from main memory word; result to R1 |
| X'2000' | Exchange R1 with main memory word; unmodified main memory word to R1 |
| X'1000' | Add M4 to main memory word; result to R1 |
| X'0800' | Subtract M4 from main memory word; result to R1 |

The bit numbering convention employed is such that the most significant bit (MSB) is referred to as M30 (or M3 bit 0), the second MSB is referred to as M31, etc. As such, and in accordance with Table 1, the bits of interest in M3 are shown in Table 2.

TABLE 2

| MSB | 2MSB | 3MSB | 4MSB | 5MSB | Action |
|---|---|---|---|---|---|
| 1 | 0 | 0 | 0 | 0 | Add one to main memory word, result to R1 |
| 0 | 1 | 0 | 0 | 0 | Subtract one from main memory word, result to R1 |
| 0 | 0 | 1 | 0 | 0 | Exchange R1 with main memory word, unmodified main memory word to R1 |
| 0 | 0 | 0 | 1 | 0 | Add M4 to main memory word, result to R1 |
| 0 | 0 | 0 | 0 | 1 | Subtract M4 from main memory word, result to R1 |

Invalid values for the M3 function mask result in a specification exception. For all cases, except the exchange function (M3=2000), a Condition Code reports on the new value of the main memory word; and the general register named by R1 is loaded with this new value if the named register is not General Register 0. In the case of the exchange function, the Condition Code reports on the updated value of the general register named by R1; and that register is always updated, even if it is General Register 0.

The resulting 2-bit Condition Code is defined as follows in Table 3.

TABLE 3

| | |
|---|---|
| 0 | Result is zero |
| 1 | Result is negative |
| 2 | Result is positive |
| 3 | Not defined |

Two program exceptions can occur during the execution of the MCOUNT Instruction. These are a Specification Exception and an Overflow Exception. The Specification Exception results from an illegal (undefined) M3 operand. The Overflow Exception indicates an overflow condition. More specifically, an overflow can occur when adding or subtracting, and will cause a program check, regardless of the setting of a binary arithmetic overflow mask. On overflow, the main memory word is not modified, and the condition code is undefined. Given a 32-bit counter (32 bits in 2's complement notation=+/−10°), the normal usage of the MCOUNT instruction should never cause an overflow.

What follows is a partial listing of the micro-code that implements the hardware assisted MCOUNT instruction of this invention. The micro-code is stored within the Control Store 14 (FIG. 2A), and is read by the CP 12 on the occurrence of an MCOUNT instruction being received over the DB0:31 bus 12a from the CACHE 16 via the CDU 18. A sub-set of the microcode bits (CS) is input to the CDU 18, which then cooperates with the CP 12 to execute the MCOUNT instruction. A first portion of the micro-code employs a CP 12 Memory Address Register (MAR) to generate the address for the second word of the two word MCOUNT Instruction. If an index register is in use, then it is added to the effective address within the MAR.

Having loaded both words of the MCOUNT Instruction, the following three microcode instructions are executed in cooperation with the logic shown in FIGS. 3A and 3B.

(1) NOP (MAR2/RW)/LDM34/ XTS1, MCNTXCHG

This micro-code instruction activates, via the CS bits, a Load Mask 3&4 (LDM34) control signal line 80 to load M3 from data bus signal lines 0:15 (DBDI0_15) into register M3 82, and to load M4 from data bus signal lines 16:31 (DBDI16_31) into register M4 84. Registers M3 82 and M4 84 each provide a 16-bit true bus (82a, 84a) and a 16-bit negated bus (82b, 84b).

During the execution of this first micro-code instruction the various outputs of M3 82 are applied to a combinatorial logic block 86 which decodes M3. If M3 is equal to 8000, 4000, 1000, or 0800 no output is provided from the logic block 86. If M3 is equal to 2000, indicating an exchange between main memory and R1, then the signal M2000 is asserted. If M3 does not equal any of the defined M3 values of Table 1, then the ERR2000 signal is asserted.

The M2000 and ERR2000 signals are applied as External Status inputs (XTS1) to the CP 12, and are checked at the completion of the first micro-instruction. If either is asserted a branch is taken to MCOUNT Exchange (MCNTXCHG) where, if M2000 is asserted, a read word from memory operation is performed, the memory word is placed in the general CP 12 register, and the content of the general register is written back out to main memory 40, thereby accomplishing the exchange operation.

If the ERR2000 status signal is asserted a branch is taken to an exception routine, thereby terminating the execution of the MCOUNT instruction.

If neither the ERR2000 or the M2000 status bits are set after the execution of the first micro-instruction, micro-code execution continues at instruction (2):

(2) NOP (/RWA,FR2)/MCOUNT/XTS1,PCHKBOVF.

This micro-code instruction reads the word to be modified from memory, stores the word in a CP 12 file register (FR2), and applies the word to a first input of an adder (ADD) 88 on a 32-bit bus 88a (RRB0_31). A second input (88b) of the adder 88 is supplied with the content of M4 84 if M3 is equal to 1000 or 0800 (see Tables 1 and 2). This is accomplished through the combinatorial logic block 90 and the sign extend (SE) block 92. The SE block 92 inputs a 16-bit half-word and outputs a sign-extended 32-bit word to the second input of the adder 88. If a subtraction operation is indicated by the output of 2OR 90a (M3 bit 1 or M3 bit 4 asserted), then a 1 is sign extended through bits 00:15, otherwise these bits are made zero, and the inversion of M4 (M40:15*) is gated through the AND gate 90c of block 90. If M3 bit I is asserted (indicating that M4 is not used for the increment) then M40:15 are also gated through the AND gate 90d, resulting in all ones being output from the OR gate 90e and applied to SE 92. If M3 bit 4 is asserted, then the inversion of M4 is gated through AND gate 90c and OR gate 90e to the input of SE 92. If M3 bit 0 is asserted, the 16-bit output of the OR gate 90e is zero. A Carry-In (CI) input of the adder 88 is set for the case where either M3 bit 0 or M3 bit 4 are asserted, via the OR gate 94.

The result of this gating scheme is the control of the operands and CI input of the adder 88 to accomplish the action dictated by the state of M3 bits 0, 1, 3, or 4, as indicated in Tables 1 and 2. The result of the addition or subtraction is provided during the execution of the second micro-code instruction on the 32-bit result bus 88c (MCOUT0_31).

The adder 88 also provides three status outputs indicating an overflow (OVFL), a zero result (ALU), and a sign (SIGN) of the output appearing on MCOUT0_31. These status outputs are provided as inputs to a combinatorial logic block 96 which generates the 2-bit condition code (MXCC) therefrom, as indicated in Table 3. It is noted that the OVFL bit being asserted results in a condition code indication of 3. However, the OVFL condition also causes the CP exception referred to above, with a branch being taken to PCHKBOVF. As such, the actual state of the condition code is not checked, and is defined in Table 3 to be undefined.

At PCHKOVF the operation of the MCOUNT instruction is terminated, and the modified word is not written back to main memory.

Assuming that the OVFL exception does not occur during the second micro-code instruction, the third micro-code instruction is executed.

(3) NOP (/WW,FR2) MCNTOP1

That is, the output word of the adder is written back to main memory, the CP register is updated with the result of the adder 88, thereby accomplishing atomic read-modify-write operation that is implemented by the MCOUNT instruction.

An appreciation of the savings in execution speed that is made possible by the hardware-assisted atomic RMW instruction of this invention can be gained by a comparison of a number of micro-instructions required to implement the conventional MCOUNT instruction, and that required to implement the hardware-assisted MCOUNT instruction of this invention. More particularly, the conventional MCOUNT instruction required approximately 40 micro-code instructions to implement, whereas the improved MCOUNT instruction made possible by this invention requires a total of approximately 15 micro-code instructions.

As a result, the overall execution time of the RMW operation is increased significantly, thereby improving the overall operating speed of the system 10 and reducing the amount of time that the memory is locked and not available to other memory requestors.

Although the teaching of this invention has been described in the context of a specific type of RMW instruction (MCOUNT), having specific fields for specifying the masks M3 and M4, it should be appreciated that this teaching has wider applicability. For example, more than two separate masks can be applied, and more or less than the five types of operations specified by M3 can be accomplished.

Thus, while the invention has been particularly shown and described with respect to a preferred embodiment thereof, it will be understood by those skilled in the art that changes in form and details may be made therein without departing from the scope and spirit of the invention.

What is claimed is:

1. A method for executing a read-modify-write instruction with a data processor, comprising the steps of:

during a first time period corresponding to a first microinstruction of a sequence of microinstructions that are executed during an execution of said read-modify-write instruction, loading a first register with first data that specifies an operation to be performed upon target data located within a memory location of a memory;

loading a second register with second data, said second data having a possibility of being combined with said target data located within said memory location; and applying said first data to logic means and decoding said first data with said logic means to determine said operation to be performed;

during a second period of time corresponding to a second microinstruction of said sequence of microinstructions, reading said target data from said memory location of said memory and, responsive to an output of said logic means, performing said specified operation by applying said target data to arithmetic/logic circuit means and operating said arithmetic/logic circuit means to perform said specified operation, wherein if said specified operation so indicates said second data stored within said second register is combined with said target data, otherwise the second data is not combined with the target data; and during a third period of time corresponding to a third microinstruction of said sequence of microinstructions, storing a result of said specified operation within a register of said data processor and also within said memory location, wherein said first register, said second register, said logic means, and said arithmetic/logic circuit means are all external to said memory.

2. A method as set forth in claim 1 wherein said first data specifies operations that include:

incrementing said target data;

decrementing said target data;

incrementing said target data by an amount specified by said second data;

decrementing said target data by an amount specified by said second data; and exchanging said target data with data stored within a register of said data processor.

3. A method as set forth in claim 1 wherein the step of decoding includes a step of detecting a condition wherein said first data does not specify a valid operation to be performed by said arithmetic/logic circuit means, and a step of generating an exception condition to notify said data processor if the first data does not specify a valid operation.

4. A method as set forth in claim 1 wherein the step of performing said specified operation includes a step of generating a plurality of condition codes indicative of a result of performing said specified operation, and a step of applying said condition codes to said data processor.

5. A method as set forth in claim 4 wherein said plurality of condition codes includes a condition code that indicates a sign of said result, and a condition code that indicates if said result is zero.

6. A method as set forth in claim 1 wherein the step of performing said specified operation includes a step of generating an exception condition to indicate that the performance of said specified operation resulted in an overflow condition.

7. Apparatus for executing a read-modify-write instruction with a data processor, comprising:

a first register for storing, during a first period of time corresponding to an execution of a first microinstruction of a sequence of microinstructions that are executed during an execution of said read-modify-write instruction, first data that specifies an operation to be performed upon target data located within a memory location of a memory;

a second register for storing, during said first period of time, second data that has a possibility of being combined with said target data located within said memory location;

logic means, operating during said first period of time, for decoding said first data to determine said operation to be performed;

means for reading said target data from said memory location of said memory during a second period of time corresponding to an execution of a second microinstruction of said sequence of microinstructions;

means having inputs coupled to said memory and to said second register and, responsive to an output of said logic means, for executing said specified operation on said target data during said second period of time, said executing means including means, responsive to said output of said logic means, for selectively combining said second data stored within said second register with said target data read from said memory location; and means for storing, during a third period of time corresponding to an execution of a third microinstruction of said sequence of microinstructions, a result of said specified operation within a register of said data processor and also within said memory location, wherein at least said first register, said second register, said logic means, and said executing means are all external to said memory.

8. Apparatus as set forth in claim 7 wherein said first data specifies operations that include:

incrementing said target data;

decrementing said target data;

incrementing said target data by an amount specified by said second data;

decrementing said target data by an amount specified by said second data; and exchanging said target data with data stored within a register of said data processor.

9. Apparatus as set forth-in claim 7 wherein said decoding means includes means for detecting a condition wherein said first data does not specify a valid operation to be performed by said executing means, and means for generating an exception condition to notify said data processor if said first data does not specify a valid operation.

10. Apparatus as set forth in claim 7 wherein said executing means includes means for generating a plurality of condition codes as a result of the execution of the operation, said condition codes indicating a result of performing said specified operation.

11. Apparatus as set forth in claim 10 wherein said plurality of condition codes includes a condition code that indicates a sign of said result, and a condition code that indicates if said result is zero.

12. Apparatus as set forth in claim 7 wherein said executing means includes means for generating an exception condition to indicate that the performance of said specified operation resulted in an overflow condition.

13. Apparatus as set forth in claim 7 wherein said first and second register means, said logic means, and said executing means are all located externally to said data processor and are coupled to said data processor and to said memory through at least one bus means.

14. In a data processing system having a data processor and a memory unit external to said data processor, a method for executing an atomic read-modify-write instruction with said data processor, comprising the steps of:

during a first time period corresponding to an execution of a first microinstruction of a sequence of microinstructions that are executed during an execution of said atomic read-modify-write instruction, loading a first register with a first data unit that specifies an operation to be performed upon target data located within a memory location of said memory unit, said first data unit specifying valid operations that include incrementing said target data, decrementing said target data, incrementing said target data by an amount specified by a second data unit, decrementing said target data by an amount specified by said second data unit, and exchanging said target data with data stored within a register of said data processor;

loading a second register with data having a possibility of being used as said second data unit; and applying said first data unit to logic means and decoding with said logic means said first data unit to determine which one of said valid operations are to be performed, said step of decoding including a step of detecting if said first data unit specifies one of said valid operations, and a step of generating an exception condition to notify said data processor if said first data unit does not specify one of said valid operations;

during a second period of time corresponding to an execution of a next microinstruction of said sequence of microinstructions, reading said target data from said memory location and, responsive to an output of said logic means, performing said specified operation by applying said target data read from said memory location to arithmetic/logic circuit means and operating said arithmetic/logic circuit means to perform said specified operation, wherein if said specified operation so indicates said second data unit is combined with said target data, said step of performing said specified operation including a step of generating a plurality of condition codes individuals ones of which are indicative of a result of performing the specified operation, and a step of applying said plurality of condition codes to said data processor; and during a third period of time corresponding to an execution of a next microinstruction of said sequence of microinstructions, storing a result of said specified operation within a register of said data processor and also within said memory location, wherein said first register, said second register, said logic means, and said circuit means are all external to said memory unit.

15. A method as set forth in claim 14 wherein said plurality of condition codes includes a condition code that indicates a sign of said result, and a condition code that indicates if said result is zero.

16. A method as set forth in claim 14 wherein the step of performing said specified operation includes a step of generating an exception condition to indicate that the performance of said specified operation resulted in an overflow condition.

17. A central processor coupled to an external memory and comprising circuitry for executing an atomic read-modify-write (RMW) instruction, the atomic RMW instruction having the format:

R1, MEMORY_ADDRESS, M3, M4, where R1 is a general data processor register into which a target memory word containing target data addressed by MEMORY_ADDRESS is copied after being modified, where M3 is a function mask that determines an operation performed by the atomic RMW instruction, the operation being one of incrementing said target data, decrementing said target data, incrementing said target data by an amount specified by M4, decrementing said target data by an amount specified by M4, and exchanging said target data with data stored within R1, and where M4 is an unsigned integer, said central processor circuitry comprising:

a first register for storing M3 during a first period of time corresponding to an execution of a first microinstruction of a sequence of microinstructions that are executed during an execution of said atomic RMW instruction;

a second register for storing M4 during said first period of time;

logic means, operating during said first period of time, for decoding M3 to determine one of said operations to be performed upon said target data;

means for reading said target data from said target memory word during a second period of time corresponding to an execution of a second microinstruction of said sequence of microinstructions;

arithmetic/logic means having a first input coupled to an output of said memory and a second input coupled to an output of said second register, said arithmetic/logic means being responsive to an output of said logic means for executing said determined one of said operations on said target data during said second period of time; and means for storing, during a third period of time corresponding to an execution of a third microinstruction of said sequence of microinstructions, a result of said specified operation within R1 and also within said target memory location.

* * * * *